US011334589B2

(12) United States Patent
Mehta et al.

(10) Patent No.: US 11,334,589 B2
(45) Date of Patent: May 17, 2022

(54) SYSTEM AND PLATFORM FOR COMPUTING AND ANALYZING BIG DATA

(71) Applicant: PAYPAL, INC., San Jose, CA (US)

(72) Inventors: Romit Mehta, Cupertino, CA (US); Andrew Alves, San Jose, CA (US); Prabhu Kasinathan, Fremont, CA (US); Ayushi Agarwal, San Jose, CA (US); Thilak Raj Balasubramanian, San Jose, CA (US); Baskaran Gopalan, Mountain House, CA (US); Praveen Kanamarlapudi, San Jose, CA (US); Laxmikant Patil, San Jose, CA (US); Deepak Mohanakumar Chandramouli, San Jose, CA (US); Anisha Nainani, Fremont, CA (US); Dheeraj Rampally, San Jose, CA (US); Meisam Fathi Salmi, Sunnyvale, CA (US); Weijun Qian, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 217 days.

(21) Appl. No.: 16/129,799

(22) Filed: Sep. 13, 2018

(65) Prior Publication Data

US 2019/0303487 A1 Oct. 3, 2019

Related U.S. Application Data

(60) Provisional application No. 62/648,909, filed on Mar. 27, 2018.

(51) Int. Cl.
*G06F 16/25* (2019.01)
*G06F 16/26* (2019.01)
*G06F 16/2458* (2019.01)

(52) U.S. Cl.
CPC ........ *G06F 16/254* (2019.01); *G06F 16/2465* (2019.01); *G06F 16/258* (2019.01); *G06F 16/26* (2019.01)

(58) Field of Classification Search
CPC .... G06F 16/254; G06F 16/26; G06F 16/2465; G06F 16/258
USPC ...................................................... 707/602
See application file for complete search history.

(56) References Cited

U.S. PATENT DOCUMENTS

| 10,095,759 | B1* | 10/2018 | Cappiello | G06F 16/24542 |
| 10,095,763 | B1* | 10/2018 | Colgrove | G06F 16/2379 |
| 10,102,258 | B2* | 10/2018 | Jacob | G06F 16/215 |
| 2014/0040182 | A1* | 2/2014 | Gilder | G06Q 40/12 707/602 |
| 2015/0142727 | A1* | 5/2015 | Louie | G06F 16/248 707/603 |
| 2016/0147380 | A1* | 5/2016 | Coates | G06F 3/0482 715/736 |
| 2017/0249434 | A1* | 8/2017 | Brunner | G06F 19/3418 |

(Continued)

*Primary Examiner* — Robert W Beausoliel, Jr.
*Assistant Examiner* — Arthur Ganger
(74) *Attorney, Agent, or Firm* — Haynes and Boone, LLP

(57) ABSTRACT

Aspects of the present disclosure involve systems, methods, devices, and the like for creating a unified analytics platform for big data analytics, visualization and data store. In one embodiment the unified analytics platform can include at least a computer platform, core data platform, and integration platform. The unified analytics platform is designed to provide visibility into datasets, provide operational metrics, and provide the integration of notebooks and tools for big data analysis.

20 Claims, 9 Drawing Sheets

(56) References Cited

U.S. PATENT DOCUMENTS

| | | | |
|---|---|---|---|
| 2017/0286510 A1* | 10/2017 | Horowitz | G06F 16/2471 |
| 2018/0039399 A1* | 2/2018 | Kaltegaertner | G06F 3/04847 |
| 2018/0341369 A1* | 11/2018 | Johnston | G06F 16/2228 |
| 2019/0042286 A1* | 2/2019 | Bailey | G06F 9/45504 |
| 2019/0108265 A1* | 4/2019 | Barmentloo | G06F 16/287 |
| 2019/0163679 A1* | 5/2019 | Srinivasa | G16H 15/00 |
| 2020/0026710 A1* | 1/2020 | Przada | G06N 20/00 |

* cited by examiner

SYSTEM AND PLATFORM FOR COMPUTING AND ANALYZING BIG DATA

RELATED MATTERS

This application claims priority benefit of U.S. Provisional Patent Application Ser. No. 62/648,909, titled "System and Platform for Computing and Analyzing Big Data" filed on Mar. 27, 2018.

TECHNICAL FIELD

The present disclosure generally relates to intelligent information computation and more specifically, to data analytics and data visualization system and platform for big data.

BACKGROUND

Today up to one third of the world's population is on a social media platform including social applications, blogs, videos, online news, etc. This data can produce up to 2.5 Exabyte of data per day and oftentimes used in data analytics for use in monitoring events, trends, likes, public relationship crisis or other significant events. Monitoring and analyzing the data, however, may be a challenge due to the volume, quality, veracity, speed of data received as well as the use of numerous systems and applications to complete. Thus, it would be beneficial to have the unified data analytics platform for use with big data.

Figure 1:
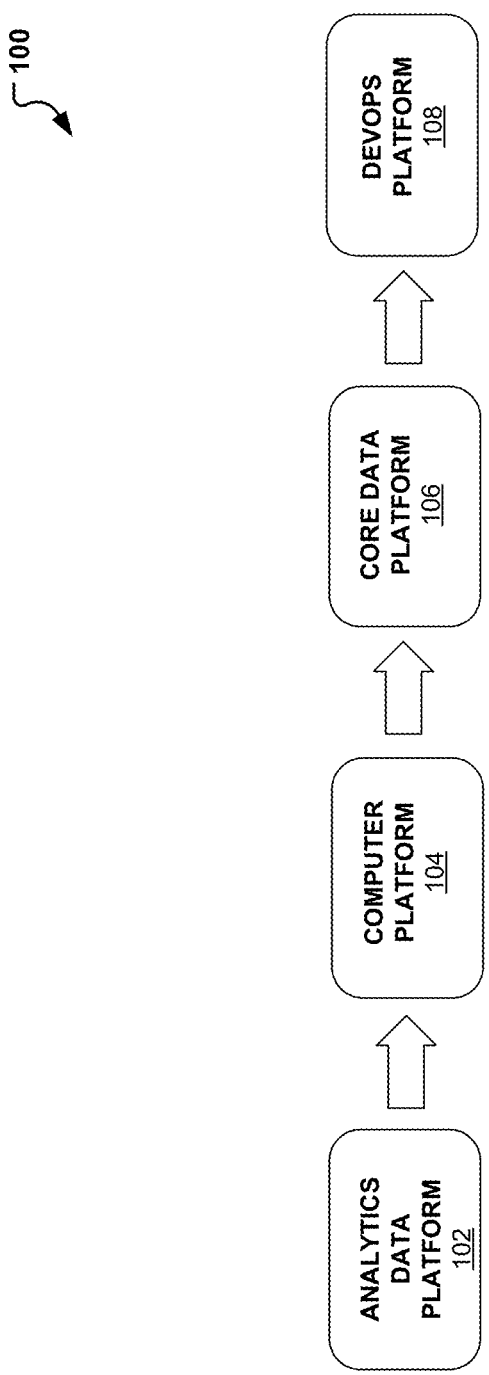
FIG. 1 illustrates a flowchart for performing big data analytics.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for creating a unified analytics platform for big data analytics, visualization and data store. In one embodiment the unified analytics platform can include at least a computer platform, core data platform, and integration platform. The unified analytics platform is designed to provide visibility into datasets, provide operational metrics, and provide the integration of notebooks and tools for big data analysis.

With today's ubiquitous use of electronics, large amounts of data are being collected. The data collected needs to be analyzed, categorized, and store. However, the data can derive from numerous origins, be very voluminous and is not always structured. Therefore, a method for ingesting large volumes of multifaceted data, categorizing and classifying it, storing it and understanding what it represents is important.

Conventionally, the classification, analysis and visualization of such data has been performed using numerous systems that may or may not be centrally located. Further, data access code can be quite cumbersome and fragile to use. Many challenges arise from the use and retrieval of such access code and data. For example, data access can be tied to various compute and data store versions, data sets may be hard to find, there may be no audit trail for data set access, and additionally statistics on the data set usage and access trends may not be available. Other challenges with the datasets also include the duplication and increase latency involved in the use of various data sets in results creation and the non-standardization of on-boarding data sets making it difficult for others to discover.

Therefore, in one embodiment, a computing data system and platform is introduced that enables such capabilities using a single platform. FIG. 1 presents a computing data platform or system flowchart for performing big data analytics using such system. In particular, FIG. 1 provides a system and platform that provide the ability to run big data applications on any compute engine to access any data storage. Further, the computing data platform provides that data analytics and integration that enables users to register their big data applications and deploy on production. In one embodiment, the computing data platform can be utilized as an isolated solution. Such solution can be composed of files (e.g., docker files) which can be used to spawn up a stack(s) or framework in a single host, enabling work in isolation. The stacks used can include but are not limited to Hadoop, hive, spark, Kafka, Elasticsearch, HBase, Cassandra, and aerospike.

As an illustration, the computing data system flowchart 100 provides an overview of the various processes that can be involved and used for performing the integrated data analytics using big data applications. For example, the computing data system begins with the analytics data platform 102. At the analytics data platform 102 can include the platform used for performing the big data analytics. Features included in the analytics data platform 102 include an Explorer feature. The explorer feature can enable the ability to view available datasets, view schema, and view system and object attributes. A discovery feature may also be included in the analytics data platform 102, which can auto discover datasets across all data stores. Additionally, a visibility feature may be included which can provide a dashboard and alerts. The visibility feature can provide operational metrics including statistics, refresh times and trends, visibility on approvals and audits as well as administrative alerts (e.g., capacity issues, data access violations, and data classification violations) and user alerts (e.g., refresh delays, and profile anomalies). Finally, the analytics data platform 102 can include a query and integration feature designed for the integration of notebooks and tools. To provide such features, the analytics data platform 102 may include at least three other platforms which may work jointly to provide the categorization, classification, analysis and mechanism for running and storing the big data. The at least three platforms can include a computer platform 104, core data platform 106, and development operations (devops) platform 108.

The computer platform 104 can be a platform designed to provide a unified user experience for any computer engine. That is to say, computer platform 104 can be an analytics platform or framework which enables a user to run one or more big data applications. For example, the computer platform 104 can enable a user to run big data applications/data processing frameworks including but not limited to Spark, Hive, Presto, etc. The big data applications can be run through a software architectural style or other interface protocol based API. For example, the interface API can include but is not limited to representational state transfer (REST) based API, Thrift based API, and simple object access protocol (SOAP) based API. Additionally, the computer platform 104 may be designed to run without installation, setup, and/or configuration. The computer platform 104 may therefore be used to provide a complete set of tools and technologies for application development, execution, logging, monitoring, alerting, security, workload management, performance tuning, etc. Further, the computer platform 104 may be used to support general compute engines (e.g., Spark) for large-scale data processing and for running interactive code(s), scheduling jobs, and for machine learning analysis. For example, interactive Spark may be used with interactive shells, Jupyter Notebooks, Apache Zeppelin, and Squirrel/DBVisualizer SQL clients. As an example of scheduled jobs, the computer platform 104 may be used to schedule jobs with low latency applications, batch heavy applications, and streaming applications. Benefits and applicability to the use of the analytics data platform 102 in conjunction of the computer platform 104 includes and not limited to improvements in administration (e.g., less maintenance, deployment of software stack, and ability to administer system configurations at one place), operations/Security (e.g., through single job execution, coding standards, logging, monitoring and alerting, auditing, and complete statement level history and metrics), development (e.g., through application modularity, ease of restorability, decreased latency, cache sharing, etc.), and analytics (e.g., for direct SQL execution, multi-user support notebooks ability, user friendly interactive applications, and authentication integration).

The computing data system can also include a core data platform 106 that can provide a unified access API for any data storage. In particular, core data platform 106 can provide scalable platform services. Such scalable data services can include data integration. For example, the core data platform 106 can facilitate the orchestration of the acquisition and transformation of data and provide a reliable and secure delivery means of the data to various destinations via streaming or batch. The core data platform can also be used as an analytics data processing platform for accessing the data located in big data applications (e.g., Hadoop) and data and analytics platform. In addition, the core data platform 106 can also provide data storage for self-service lifecycle management of a singular and clustered data stores and management of commodity based storage. Additionally, the core data platform 106 can be used for learning, optimizing, building, deploying and running various applications and changes. For example, the data application lifecycle on the core data platform 104 can include onboarding big data applications and manage compute engine changes, compute version changes, storage API changes, storage connector upgrades, storage host migrations, and storages changes.

The computing data system can also include a devops platform 108. The devops platform 108 can be used to provide a unified experience for big data applications. In one embodiment, the unified experience can be provided by a common platform for the integration of the computing data system. For example, the computing data system can include a unified experience via the devops platform 108 which integrates a deployment software platform or other similar platform useful in enabling the automation of large scale data analytics and workload computations. Exemplary visualization and user interfaces will be described below and in conjunction with FIGS. 5A and 5B.

Figure 2:
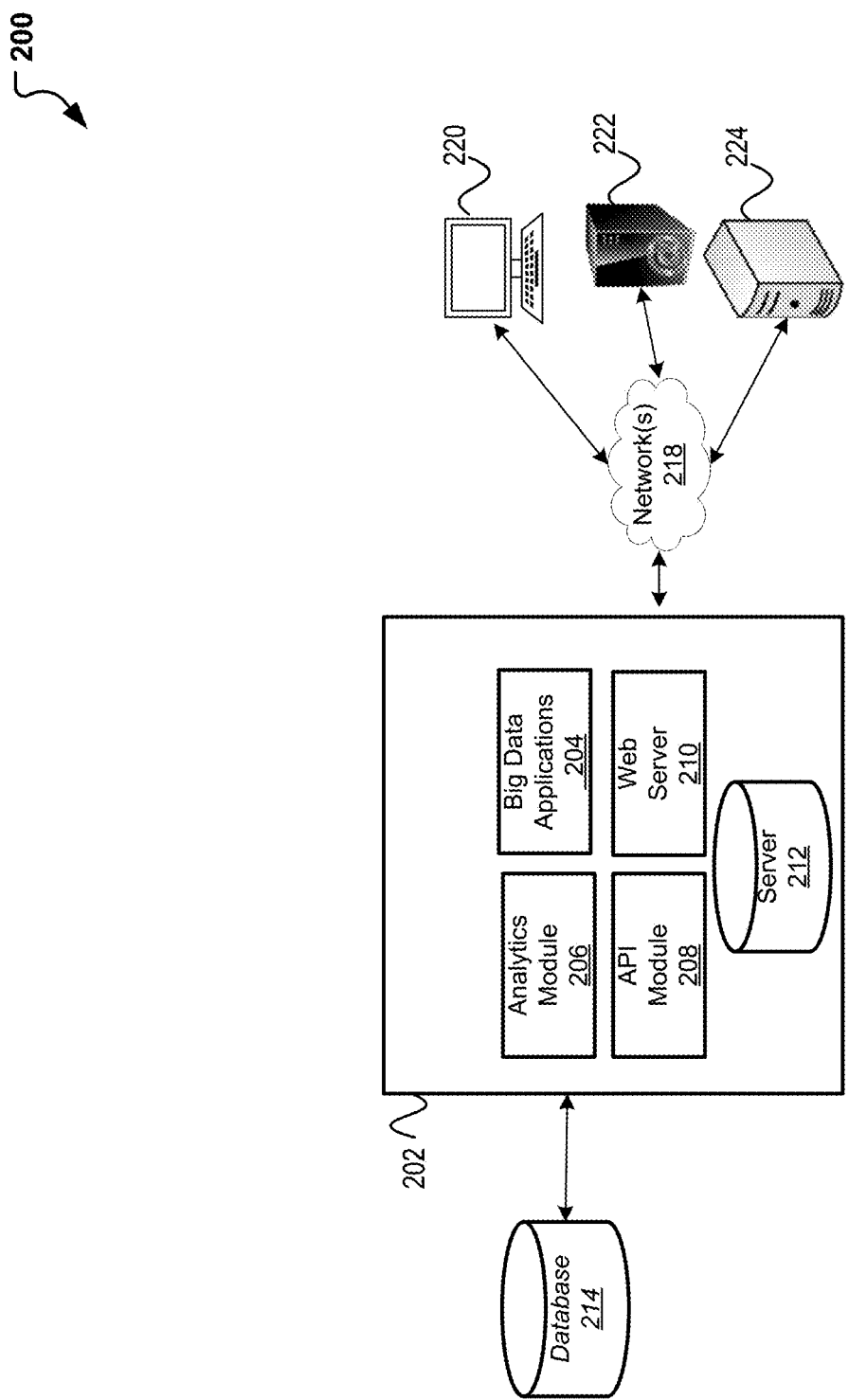
FIG. 2 illustrates a block diagram illustrating a data analytics and visualization system for big data analytics.

As indicated, the data can derive from numerous locations and need to be analyzed and stored. FIG. 2 illustrates an exemplary block diagram of the computing data system 200 capable of performing the data analytics, and integrating the big data applications enabling deployment on production. The computing data system 200 can include at least a database(s) 214, a unified analytics platform 202, and/or external peripherals 220-224. The unified analytics platform 202 can be a system design to enable the real-time presentation, analytics, and visualization of media data. For example, the unified analytics platform 202 can be designed to enable coding and quick deployment. As another example, the unified analytics platform 202 can be designed to perform all read and write operations with a simple command (e.g., single line of code) and use standard coding syntax (e.g. SQL) to query data from any analytic data store or database 214. Still as another example, the unified analytics platform 202 can designed to debug and monitor big data programs in real-time while maintaining security and compliance. The unified analytics platform 202 can also include a big data applications module 204, an analytics module 206, an Application Programming Interface (API) 208, web server 210, and a server 212. The unified analytics platform 202 can perform the real-time analytics included in FIG. 1 using at least analytics module 206. In particular, the analytics module 206 may be used for monitoring, responding, predicting and prescribing how to respond and/or interpret the data. To perform such analytics, the analytics module 206 may include an artificial intelligence engine with natural language processing capabilities, machine learning algorithms, and/or communicate with and run one or more of the big data applications on any compute engine.

As illustrated, the unified analytics platform 202 can also include an application programming interface (API) module 208. The API module 208 can act as an interface with one or more database(s) 214. In addition, API module 208 can communicate with big data applications 204 to retrieve data from database nodes and/or monitor movements of the data across the database nodes and other media data deriving from the network(s) 218. In some embodiments, the API module 208 may establish a universal protocol for communication of data between the API module 208 and each of the database(s) 214 and/or nodes and compute engines. In other embodiments, the API module 208 may generate a data request (e.g., a query) in any one of several formats corresponding to the database 214. Based on a request for data intending for a specific database from the big data applications 204, the API module 208 may convert the request to a data query in a format (e.g., an SQL query, a DMX query, a Gremlin query, a LINQ query, and the like) corresponding to the specific database. Additionally, the server 212 may store, and retrieve data previously stored for use with the analytics module 206.

As illustrated in FIG. 2, the data may be stored and/or retrieved and proceed to an application programming interface 208 where the database 214, big data applications module 204, and external devices can interact with the unified analytics platform 202. In addition, the API 208 can act as a cross cluster API, which allows the unified analytics platform 202 to access data across various clusters with the capability to read the data in such clusters and compute on such clusters and/or a different cluster. For example, the unified analytics platform 202 can access data across HDFS clusters and Alluxio clusters and computer on a Spark cluster. Further, the API 208 can include a Spark Aerospike API to provide write capabilities such that for each partition of a dataframe, a client connection is established, to write data from that partition to Aerospike. Still further, the API 208 can be used to integrate with Livy interpreter which enables the execution of batch workloads of SQL and/or streaming workloads of SQL via Jupyter notebooks. The API 208 also communicates with at least the big data applications 204 to enable the data analytics provided by external applications. Therefore, the unified analytics platform 202 may be integrated with a computer project such as Jupyter for the user in big data and machine learning.

In some embodiments, the unified analytics platform 202 can communicate with external devices, compute engines, frameworks, components, peripherals 220-224 via API module 208. API module 208 can, therefore, act as an interface between one or more networks 218 (and systems/peripherals 220-224) and the unified analytics platform. Peripherals 220-224 can include networks, servers, systems, computers, devices, clouds, and the like which can be used to communicate digital media and/or other source from which the big data is being generated or retrieved. The data communicated (e.g., scraped) from the web over the network 218 can be used for the real-time presentation, analytics, and visualization. In some embodiments, the data retrieved may reside within the entity, on a cloud, server, catalog, or other data store.

The unified analytics platform 202, as indicated, includes a server 212 and network 218 and thus can be a network-based system which can provide the suitable interfaces that enable the communication using various modes of communication including one or more networks 218. The unified analytics platform 202 can include the web server 210, and API module 208 to interface with the at least one server 212. It can be appreciated that web server 210 and the API module 208 may be structured, arranged, and/or configured to communicate with various types of devices, third-party devices, third-party applications, client programs, mobile devices and other peripherals 220-224 and may interoperate with each other in some implementations.

Web server 210 may be arranged to communicate with other devices and interface using a web browser, web browser toolbar, desktop widget, mobile widget, web-based application, web-based interpreter, virtual machine, mobile applications, and so forth. Additionally, API module 208 may be arranged to communicate with various client programs and/or applications comprising an implementation of an API for network-based system and unified analytics platform 202.

For example the unified analytics platform 202 may be designed to provide an application with an interactive web interface, platform, and/or browser by using the web server 210. The interactive web interface, may enable a user to view different reports or performance metrics related to a particular group and for a particular set of big data analytics.

In addition, the unified analytics platform 202 can determine the type of storage a dataset is. This can be determined during the read and/or write by the catalog entry in server (e.g., Unified Data Catalog 350 FIG. 3). Once this is determined, an API may then perform a translation from a logical name that may be provided in the code received (e.g., in the SQL) to a physical or native code that needs to be written to read and/or write. The unified analytics platform 202 can further function as an extensible catalog provider supporting user owned catalogs and/or user defined catalog properties (e.g., in programs such as Hive or in a rest based service). Additionally, the unified analytics platform 202 can be used to provide a new provider where product descriptions including but not limited to storage type, properties required to initiate the connection with the storage system, and any other user driven behavior that may be applied while accessing the storage via the unified analytics platform 202.

Figure 3:
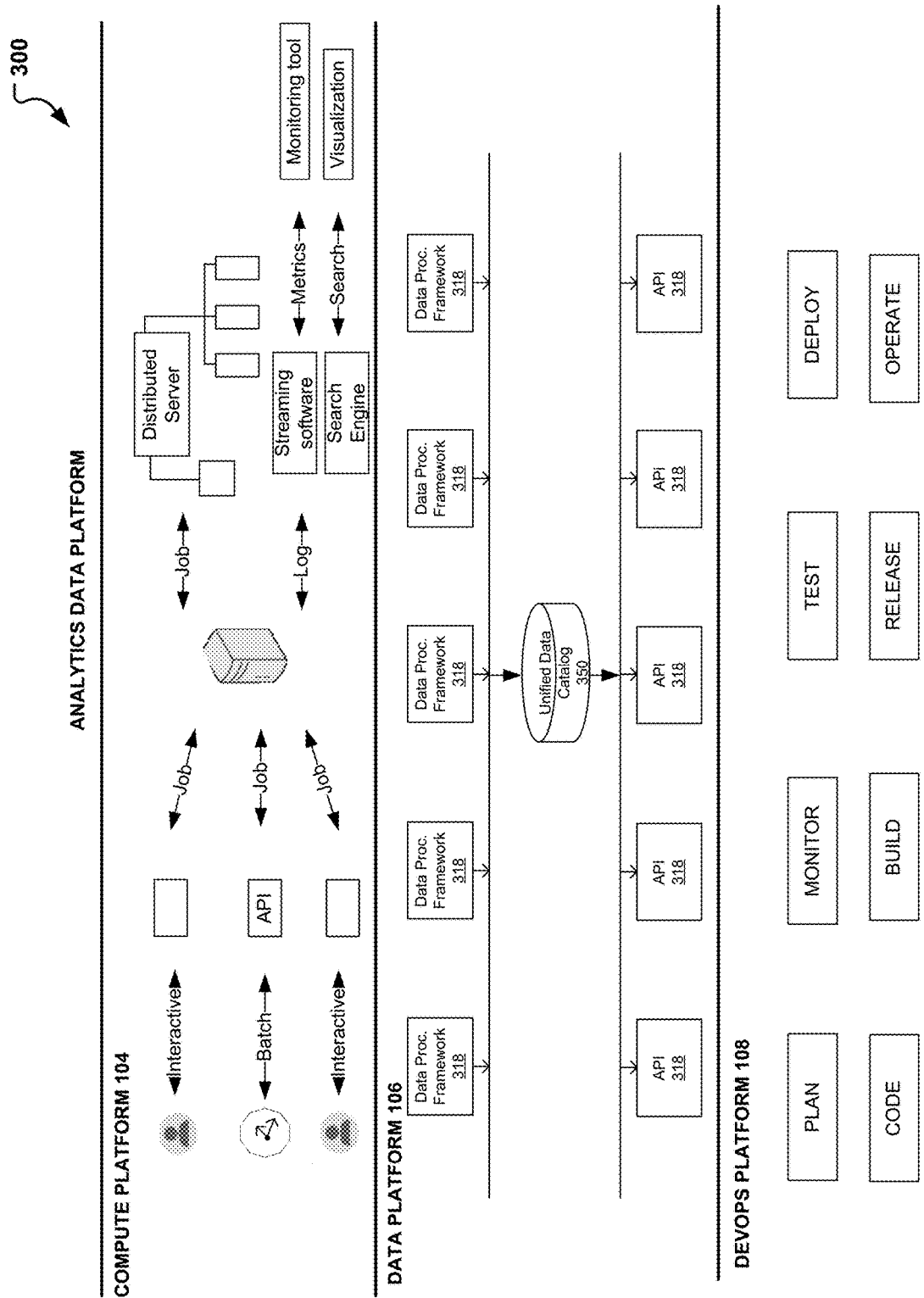
FIG. 3 illustrates a block diagram of the data analytics platform.

Further to the unified analytics platform 202, an analytics data platform 300 (previously referred as analytics data platform 102) may be available for providing data processing and big data analytics. As indicated in FIG. 1, the analytics data platform may be a platform designed to enable visibility into datasets, features, queries, alerts, and provide single system integration. As illustrated in FIG. 3, analytics data platform 300, includes at least three other platforms which may work jointly to provide the categorization, classification, analysis and mechanism for running and storing the big data. The at least three platforms include a computer platform 104, core data platform 106, and development operations (devops) platform 108.

The compute platform 104, as previously indicated, can be the analytics platform which enables a user to run multiple big data applications. It can be a platform that may be used for developing, executing, logging, monitoring, alerting, and performing workload management without the need for installation, setup, and/or configuration. This may be done by a user and/or automated via an interactive and/or batch process. An API or other interface may be used to request/query the system for a job and be in communication with a server and distributed file system such as Hadoop. Conventional systems, often encounter errors or issues in bringing in stream data stored and loading into a distributed file system. In addition, minimal SQL or other tools exist which are able to take the data from the distributed file system and publish it. In some instances, a user is needed to write the data for each source. Such manual interaction may lead to delays as the system needs to be learned, coded, optimized, deployed, and run by the user.

Thus, in one embodiment, the computer platform 104 is introduced to provide the use of a job server which may interact with the Hadoop (or other distributed file system) for requesting/querying jobs. The job server may thus manage the incoming jobs. In some instances, notebooks are added to the computer platform 104. The job server may then communicate with the notebooks for submitting/requesting jobs when the computer platform 104 is operating in an interactive mode. The notebooks provide a mechanism for simplifying the job requests to a read/write command. In other instances, an API may be used for real-time access and login to a machine for submitting a job when operating in batch mode. Also part of the computer platform 104, may be an automatic login framework which can not only add basic framework login, but can also provide a pipeline to a streaming software such as Kafka and/or a distributed search engine such as Elastic search, such that a log is maintained providing visibility into what was run, where, by whom, etc. Further, because Kafka (or other streaming software) is used, metrics, searches, and possible alerts may be obtained in conjunction with an enterprise monitoring system.

The data platform 106, as previously indicated, can provide scalable platform services including, facilitating the orchestration and transformation or the optimization of data/information. The data platform 106, may include a Unified Data Catalog 350 which can serve as management of singular and clustered data stores and other commodity based storage. The Unified Data Catalog may also work as a server for enabling the use of a structured query language for data metrics. In addition, the Unified Data Catalog 350 may include metadata, metadata services which provide the physical properties of all data sets, and discovery services which can scan data stores. Such services and use of metadata provides a convenient and efficient means for obtaining real-time/instant results regarding the datasets without having to establish a session. In addition, further to the capabilities described above and in conjunction with FIG. 1, data platform 104 may also use the Unified Data Catalog 350 for obtain metrics and for logical naming of the data stores.

The devops platform 108 is then the platform in the analytics data platform 300 which may be used as the unifying platform that provides the integrated experience. As illustrated in FIG. 3, devops platform 108 may be a platform where monitoring, testing, deployment, coding, planning, building, releasing and operating on the big data may occur. In particular, devops platform 108, may be the platform that enables the automation of large scale data analytics and workload computations.

Note that further to the functionality and platforms associated with analytics data platform 300, other functions, capabilities, and platforms may be contemplated. The architecture and information provided in conjunction with FIG. 3 are not restricting and are meant to provide exemplary components that would enable the integration and analytics of big data.

Figure 4:
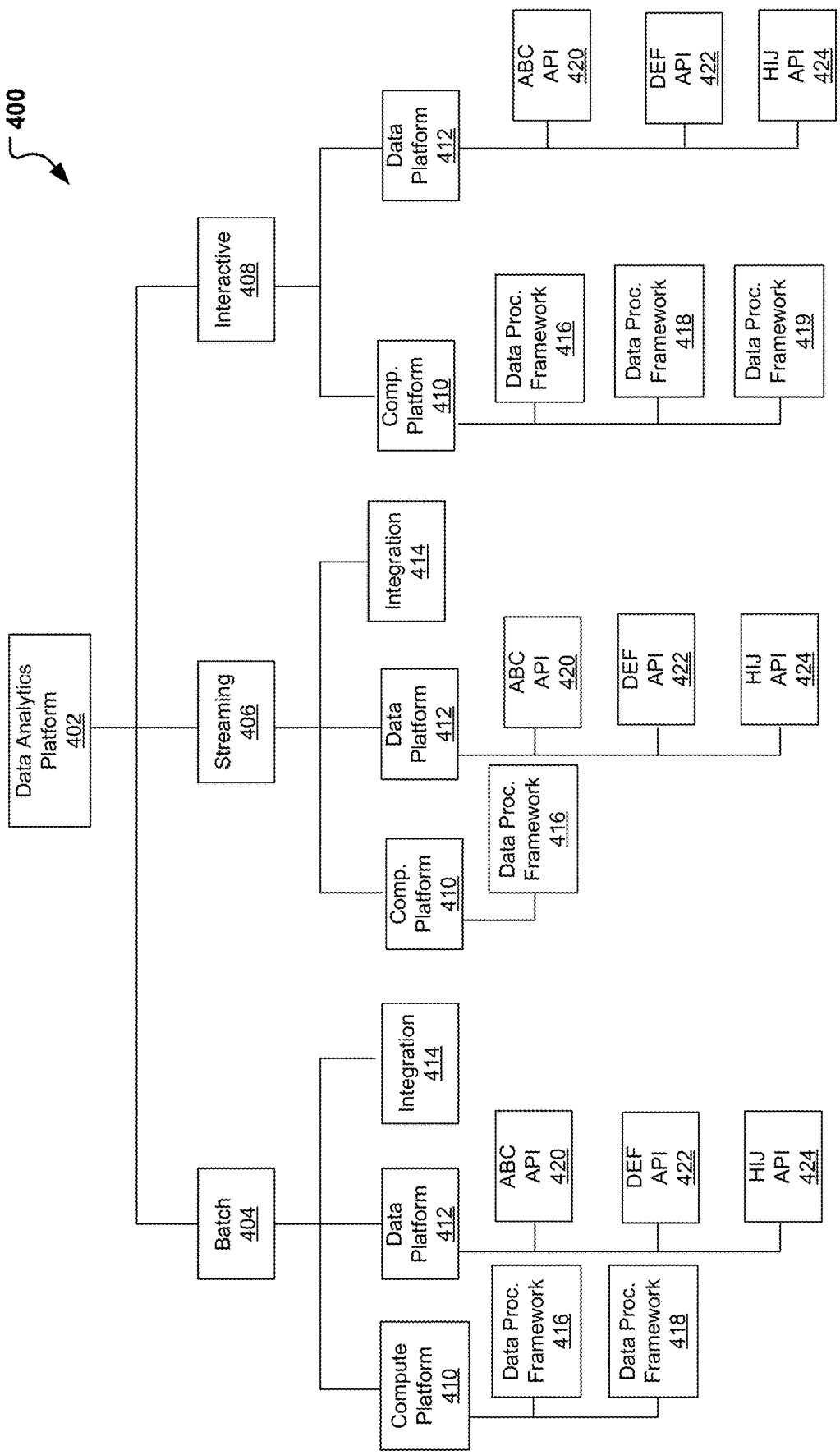
FIG. 4 illustrates a chart illustrating exemplary data analytics platform capabilities.

Turning to FIG. 4, recall that the data analytics platform 300 has the capacity to process data in numerous ways. In particular, as illustrated in FIG. 4, the data analytics platform 402/300 has the capacity to batch 404, stream 406, and interactively 408 manipulate data using at least the compute platform 410 (e.g., computer platform 104), the data platform 412 (e.g., core data platform 106), and integration platform 414 (e.g., devops platform 108).

In one embodiment, the unified analytics platform 402 (previously referred to as data analytics platform 300), is able to read using a streaming software such as Kafka as a batch and/or read from Kafka continuously as streams. Generally, such capability is not available as an out of the box feature, which can switch between batch and stream intelligently based on the processing capability in the application and the incoming rate of data. However, the unified analytics platform 202 and dataset tool is equipped with an intelligent mode that can seamlessly switch between batch and stream. This intelligent mode enables users the abstraction available for managing the application between batch and stream and further the ability to work with an architecture for processing data from Kafka in an automated fashion.

Further, the unified analytics platform 402 is able to read from the Kafka continuously as streams using one or more programming languages (e.g., SQL). The use of such languages such as SQL can be used to stream, format, enable, and disable checkpoints. In particular, the platform may run SQL to stream from Kafka and compute over a computing framework such as Spark. This may be done using the computing framework such as Spark and/or other computing systems or projects (e.g., Jupyter). Further, Kafka can include distributed SQL support. Thus, the unified analytics platform 402 is capable of writing SQL on Kafka topics providing the ability to read/consume data, write/post data, and support various data formats including but not limited to binary, plain text, JSON text and Avro. Additionally, the unified analytics platform 402 is capable of executing models in both batch mode and/or stream mode and may support an execution mode that is completely distributed using SQL and by leveraging the Spark engine.

Distributed SQL support can also extend beyond it Kafka and to ES, Aerospike, and Cassandra. For example, distributed SQL support for ES can provide access to elastic searches via Spark SQL. As another example, distributed SQL support for Aerospike and/or Cassandra can enable reads and writes directly into Aerospike/Cassandra.

Further, as indicated above and in conjunction with FIG. 1, the computer platform 104/compute platform 410 is capable of enabling a user to run big data applications/data processing frameworks. These data processing frameworks 416, 418, and 419 can include and are not limited to Spark, Hive, Presto, etc. Note that in some instances, one data processing framework 416 may be used while in other instances all three 416, 418, and 419 may be used. For example, in one embodiment where batch data processing and manipulation is used, Spark and Hive may be used. In another embodiment, where data streaming is occurring, Spark may be the only data processing framework used 416. Still in another embodiment, where interactive data manipulation is occurring, Presto, Hive and Spark may be used. Note that although data manipulation has been described to be used with a specific data processing framework, other variations may be contemplated.

In the data platform 412, the orchestration of the acquisition and transformation of data can be facilitated. Additionally, the data platform 412 can also be used as an analytics data processing platform for accessing the data located in big data applications and data and analytics platform. For example, the data platform can communicate with and interface using one or more of APIs 420-424. The APIs can include but are not limited to HDFS API, Hbase API, Elastic API, Kafka API, Teradata API, etc. and generally designed as ABC API 420, DEF API 422, and HIJ API 424.

Note that information processing whether batch 404, streaming 406, and/or interactive 408 is then integrated via devops. As previously indicated, in the devops platform 108 and can be used to provide a unified experience for big data applications. In one embodiment, the unified experience can be provided by a common platform (e.g., data analytics platform 402) for the integration of the computing data system.

Figure 5A:
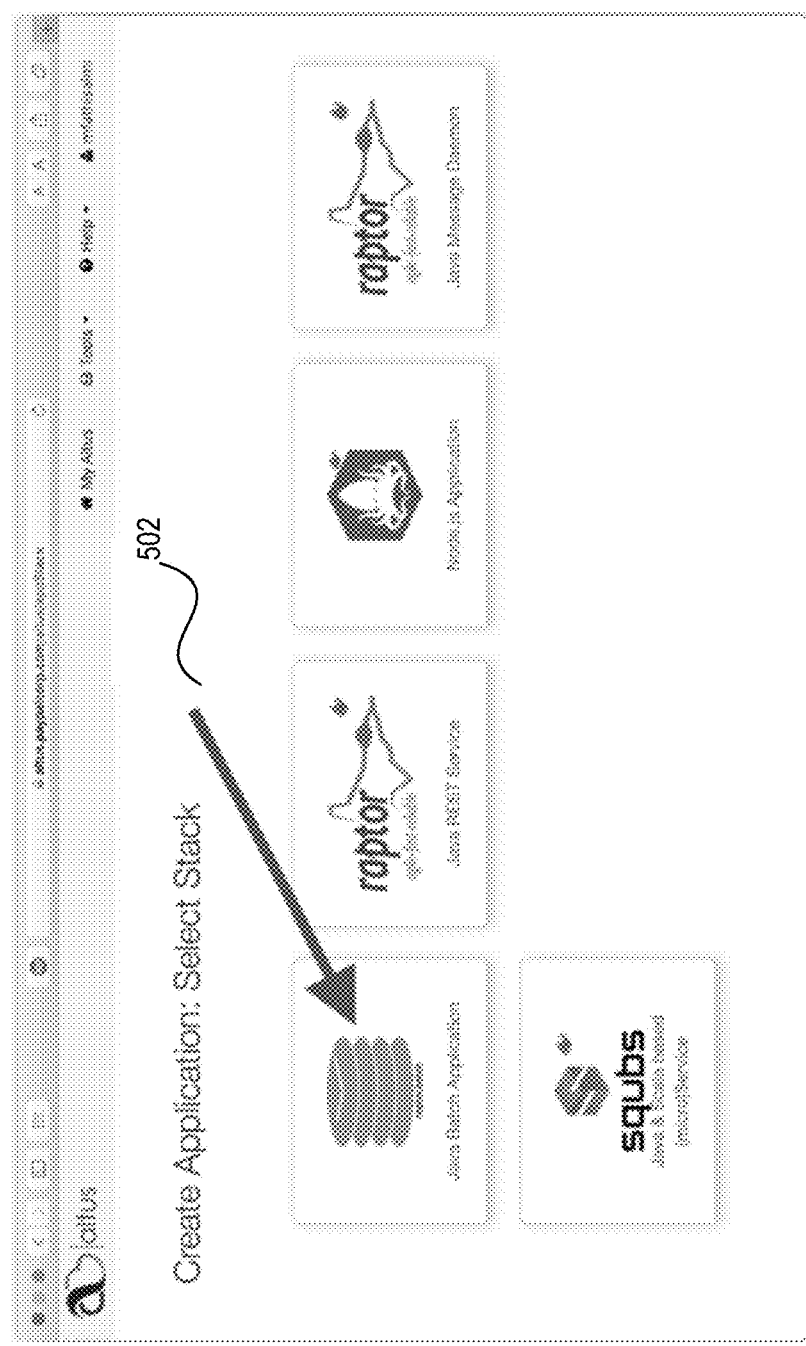
FIGS. 5A-5B illustrate exemplary interactive interfaces generated by the data analytics and visualization system.
Figure 5B:
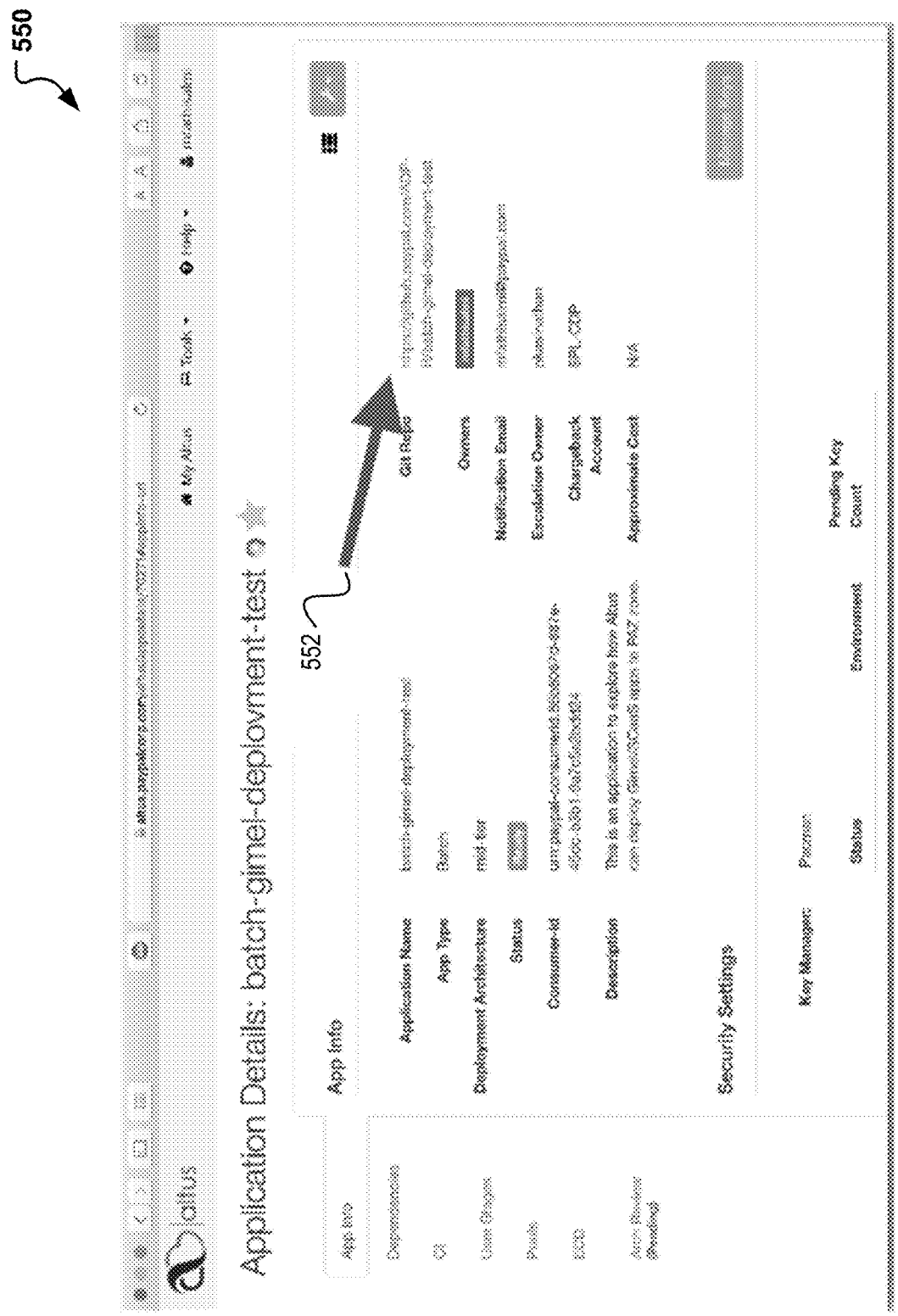

During the integration of the data analytics platform, via the devops platform 108, interactive user interfaces may be used for the presentation of the information and integration of the system. FIGS. 5A-5B provide data visualizations for analytics data platform 102. In particular, FIGS. 5A-5B include exemplary interactive user interfaces that may be used in communicating with the unified analytics platform. For example, as indicated above, a deployment software may be used to provide the unified analytics platform which would enable the deployment of the unified analytics platform for use and production. FIG. 5A illustrates an exemplary deployment software interface 400 that may be used to create the application and the selection of at least a Stack for use. As illustrated, various stacks 502 are available including but not limited to Squbs, Raptor, Node, and Java. Once the stack 502 is selected, additional interfaces may be presented which can lead a user through the selection, naming, and customization of the integration of the system. Additionally, approvals, storage, and URL creation may follow. As an example, FIG. 5B illustrates an exemplary deployment software interface that may be used to batch 550 the data analytics platform for deployment. FIG. 5B in particular presents the customization 552 via a URL and ability to change source code for further application customization. Once customization is completed, approvals, pools and finally deployment of the application may occur.

Figure 6:
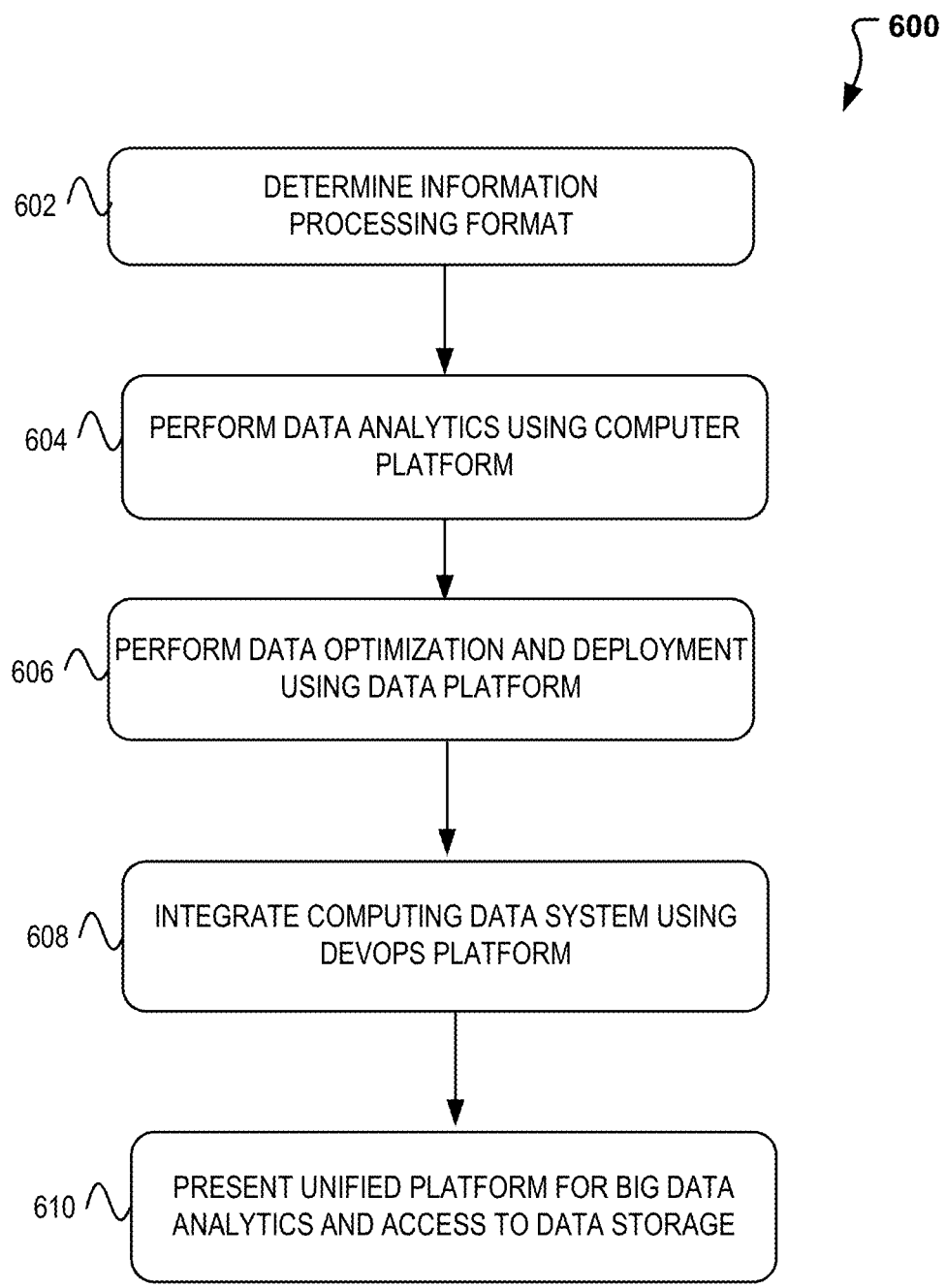
FIG. 6 illustrates a flow diagram illustrating operations for performing data analytics and visualization.
Figure 7:
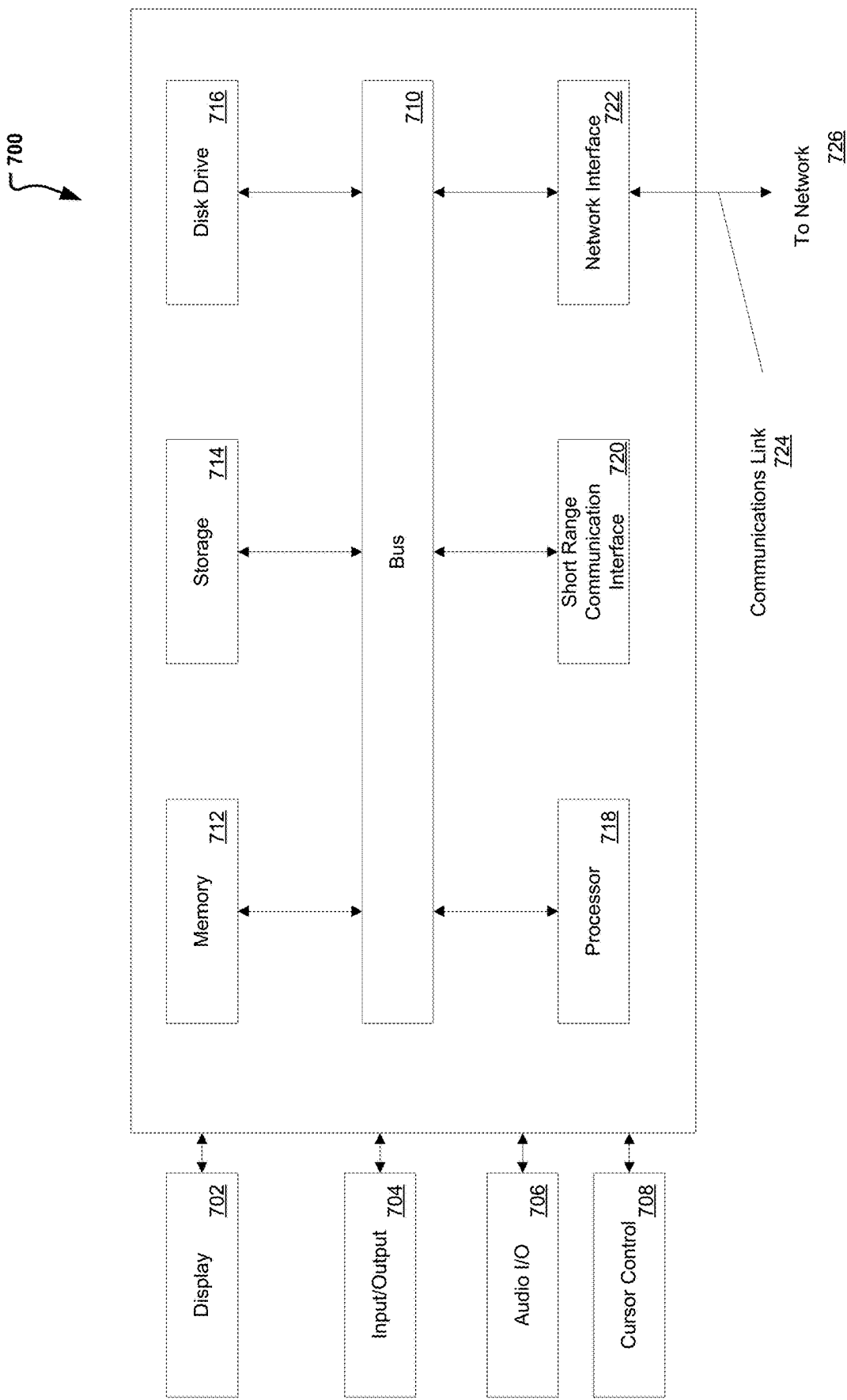
FIG. 7 illustrates an example block diagram of a computer system suitable for implementing one or more devices of the communication systems of FIGS. 1-5.

To illustrate how the interactive user interfaces and unified analytics platform 202 and analytics data platform 300 may be used, FIG. 6 is introduced which illustrates example process 600 that may be implemented on a system 700 of FIG. 7. In particular, FIG. 6 illustrates a flow diagram illustrating how a unified analytics platform can perform the data analytics and visualization using big data. According to some embodiments, process 600 may include one or more of operations 602-610, which may be implemented, at least in part, in the form of executable code stored on a non-transitory, tangible, machine readable media that, when run on one or more hardware processors, may cause a system to perform one or more of the operations 602-610.

Process 600 may begin with operation 602, where it is determined how the data will be processed. For example, as described above and in conjunction with FIG. 4, the data may be processed and utilized using batch, streaming, or interactive schemes. Once the format is determined, process 600 continues to operation 604 where data analytics may be performed using at least a computer platform. As previously indicated, large data is constantly collected and the computer platform can be used to enable a user to run one or more big data applications. For example, the computer platform can enable a user to run big data applications/data processing frameworks including but not limited to Spark, Hive, Presto, etc.

Figure 8:
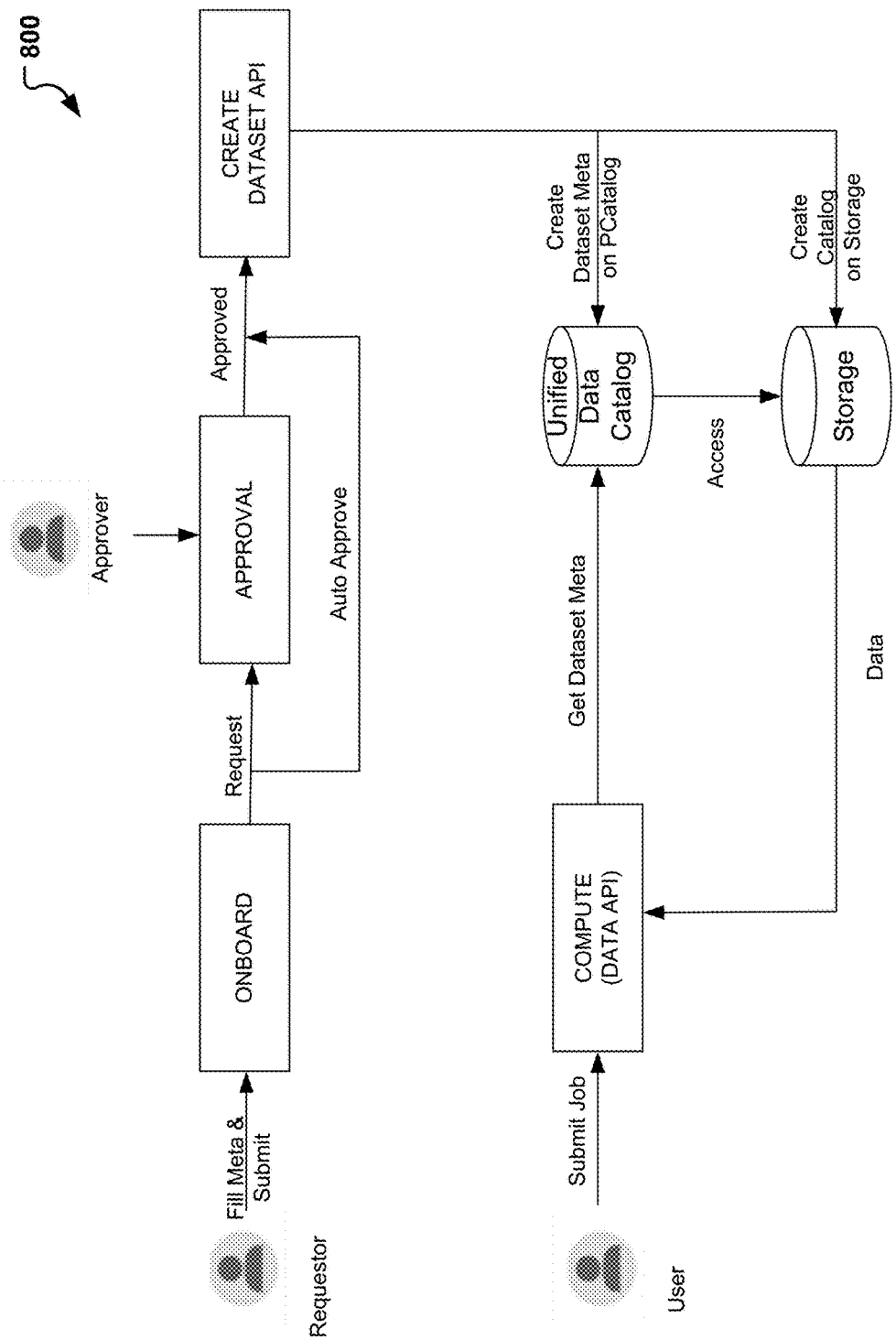
FIG. 8 is included which describes the dataset registration process flow performed by the data platform.

At operation 606, data optimization and deployment is made possible. This optimization and deployment is possible with the incorporation of a core data platform which can provide a unified access API for any data storage. In particular, core data platform can provide scalable platform services which can include the data integration and optimization. For example, the core data platform can facilitate the orchestration of the acquisition and transformation of data and provide a reliable and secure delivery means of the data to various destinations via streaming or batch. As a reference, FIG. 8 is included which describes the dataset registration process flow that may occur in the data platform. Recall that the data platform is capable of processing and storing the metadata of the data stores. Such metadata provides the ability to process, and obtain data metrics in a simultaneous/real-time fashion.

Process 600 then continues to operation 608 wherein integration is provided by the unified data analytics platform. The integration can occur using at least a deployment software platform and described above and in conjunction with FIGS. 5A-5B. Again, with the use of the deployment software platform, at least one of various stacks may be selected and information deployment and optimization may be indicated using the deployment software platform. Once integration has occurred at operation 608, process 600 may proceed to operation 610, where the unified analytics platform is available, presented, and may be used for big data analytics and data storage.

FIG. 7 illustrates an example computer system 700 in block diagram format suitable for implementing on one or more devices of the system in FIGS. 1-6 and in particular unified analytics platform 202. In various implementations, a device that includes computer system 700 may comprise a personal computing device (e.g., a smart or mobile device, a computing tablet, a personal computer, laptop, wearable device, PDA, etc.), or other system and platform that is capable of communicating with a network 726 (e.g., networks 218). A service provider and/or a content provider may utilize a network computing device (e.g., a network server) capable of communicating with the network. It should be appreciated that each of the devices utilized by users, service providers, and content providers and may be implemented as computer system 700 in a manner as follows.

Additionally, as more and more devices become communication capable, such as new smart devices using wireless communication to report, track, message, relay information and so forth, these devices may be part of computer system 700. For example, windows, walls, and other objects may double as touch screen devices for users to interact with. Such devices may be incorporated with the systems discussed herein.

Computer system 700 may include a bus 710 or other communication mechanisms for communicating information data, signals, and information between various components of computer system 700. Components include an input/output (I/O) component 704 that processes a user action, such as selecting keys from a keypad/keyboard, selecting one or more buttons, links, actuatable elements, etc., and sending a corresponding signal to bus 710. I/O component 704 may also include an output component, such as a display 702 and a cursor control 708 (such as a keyboard, keypad, mouse, touchscreen, etc.). In some examples, I/O component 704 other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 718, which may be a micro-controller, digital signal processor (DSP), or other processing component, that processes these various signals, such as for display on computer system 700 or transmission to other devices over a network 726 via a communication link 724. Again, communication link 724 may be a wireless communication in some embodiments. Processor 718 may also control transmission of information, such as cookies, IP addresses, images, and/or the like to other devices.

Components of computer system 700 also include a system memory component 714 (e.g., RAM), a static storage component 714 (e.g., ROM), and/or a disk drive 716. Computer system 700 performs specific operations by processor 718 and other components by executing one or more sequences of instructions contained in system memory component 712 (e.g., for engagement level determination).

Logic may be encoded in a computer readable medium, which may refer to any medium that participates in providing instructions to processor 718 for execution. Such a medium may take many forms, including but not limited to, non-volatile media, volatile media, and/or transmission media. In various implementations, non-volatile media includes optical or magnetic disks, volatile media includes dynamic memory such as system memory component 712, and transmission media includes coaxial cables, copper wire, and fiber optics, including wires that comprise bus 710. In one embodiment, the logic is encoded in a non-transitory machine-readable medium.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 700 may also include a short-range communications interface 720. Short range communications interface 720, in various embodiments, may include transceiver circuitry, an antenna, and/or waveguide. Short range communications interface 720 may use one or more short-range wireless communication technologies, protocols, and/or standards (e.g., WiFi, Bluetooth®, Bluetooth Low Energy (BLE), infrared, NFC, etc.).

Short range communications interface 720, in various embodiments, may be configured to detect other systems, devices, peripherals, and data stores with short range communications technology near computer system 700. Short range communications interface 720 may create a communication area for detecting other devices with short range communication capabilities. When other devices with short range communications capabilities are placed in the communication area of short range communications interface 720, short range communications interface 720 may detect the other devices and exchange data with the other devices. Short range communications interface 720 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 720 may identify a local area network using a short range communications protocol, such as WiFi, and join the local area network. In some examples, computer system 700 may discover and/or communicate with other devices that are a part of the local area network using short range communications interface 720. In some embodiments, short range communications interface 720 may further exchange data and information with the other devices that are communicatively coupled with short range communications interface 720.

In various embodiments of the present disclosure, execution of instruction sequences to practice the present disclosure may be performed by computer system 700. In various other embodiments of the present disclosure, a plurality of computer systems 700 coupled by communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 724 and a communication interface. Received program code may be executed by a processor as received and/or stored in a disk drive component or some other non-volatile storage component for execution.

FIG. 8 is included which describes the dataset registration process flow 800 that may occur in the data platform 106. As illustrated, the dataset registration process flow 800 can include at least a requestor and a user enabling the registration. The dataset registration process flow 800 can include various stages including but not limited to an onboard, approval, and API creation stage. Additionally, at the user's end, dataset registration flow 800 can include the job submission, access, and retrieval of the dataset metadata created.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing instructions; and
a processor configured to execute the instructions to cause the system to:
automatically discover that information is available for processing at a plurality of data storages;

receive an application request, from an integration platform, to retrieve the information from a data storage of the plurality of data storages, wherein the data storage corresponds to a data analytics application in which the application request was received, wherein the data analytics application is one of a plurality of data analytics applications integrated into the integration platform, and wherein each of the plurality of data analytics applications is associated with one or more of the plurality of data storages;

based on a type of the data storage, determine a processing format for a data query to the data storage;

convert the application request to the data query having the processing format that is accepted by the data storage;

based on the data query, retrieve the information from the data storage via an application programming interface that corresponds to the data storage;

determine a processing capability of the data analytics application and an incoming rate of data from the data storage;

based on the processing capability of the data analytics application and the incoming rate of data from the data storage, switch a processing of the information from batch processing to stream processing;

perform data analytics, using a computer platform, on the retrieved information;

in response to the data analytics performed, optimize the information for deployment into the integration platform, wherein the optimization allows for a visual presentation of the data analytics of the retrieved information integrated with other visual presentations of data analytics corresponding to other data analytics applications of the plurality of data analytics applications integrated into the integration platform;

integrate the retrieved information and the optimized information into the integration platform;

visually present the data analytics of the retrieved information via a graphical user interface of the integration platform; and provide access to the retrieved information via the graphical user interface of the integration platform.

2. The system of claim 1, wherein the performing the data analytics includes using a job server of the computer platform to execute a job request submitted in an interactive mode or a batch mode.

3. The system of claim 2, wherein the job request is executed in the interactive mode, and wherein the executing the job request in the interactive mode includes using notebooks for simplifying the job request to a read or a write operation.

4. The system of claim 2, wherein the job request is submitted in the batch mode, and wherein the batch mode includes a real-time API access for submitting the job request.

5. The system of claim 2, wherein the performing the data analytics, using the computer platform, includes obtaining an alert from an enterprise monitoring system.

6. The system of claim 1, wherein the optimizing the retrieved information includes transforming the retrieved information using at least a Unified Data Catalog, and wherein the transformation using at least the Unified Data Catalog enables storage and use of metadata associated with the retrieved information.

7. The system of claim 6, wherein the metadata associated with the information comprises real-time metrics about the retrieved information.

8. The system of claim 1, wherein the graphical user interface comprises a dashboard.

9. The system of claim 8, wherein the data analytics of the retrieved information is visually presented in the dashboard, and wherein the access to the retrieved information is provided through the dashboard.

10. The system of claim 8, wherein the processor is further configured to execute instructions to cause the system to:

provide an alert in the dashboard in response to the determining that the information is available for processing at the plurality of data storages.

11. A method comprising:

automatically discovering that information is available for processing at a plurality of data storages;

receiving an application request, from an integration platform, to retrieve the information from a data storage of the plurality of data storages, wherein the data storage corresponds to a data analytics application in which the application request was received, wherein the data analytics application is one of a plurality of data analytics applications integrated into the integration platform, and wherein each of the plurality of data analytics applications is associated with one or more of the plurality of data storages;

based on a type of the data storage, determining a processing format for a data query to the data storage;

converting the application request to the data query having the processing format that is accepted by the data storage;

based on the data query, retrieving the information from the data storage via an application programming interface that corresponds to the data storage;

determining a processing capability of the data analytics application and an incoming rate of data from the data storage;

based on the processing capability of the data analytics application and the incoming rate of data from the data storage, switching a processing of the information from batch processing to stream processing;

performing data analytics, using a computer platform, on the retrieved information;

in response to the data analytics performed, optimizing the information for deployment into the integration platform, wherein the optimizing allows for a visual presentation of the data analytics of the retrieved information integrated with other visual presentations of data analytics corresponding to other data analytics applications of the plurality of data analytics applications integrated into the integration platform;

integrating the retrieved information and the optimized information into the integration platform;

visually presenting the data analytics of the retrieved information via a graphical user interface of the integration platform; and providing access to the retrieved information via the graphical user interface of the integration platform.

12. The method of claim 11, wherein the performing the data analytics includes using a job server of the computer platform to execute a job request submitted in an interactive mode or a batch mode.

13. The method of claim 12, wherein the job request is executed in the interactive mode, and wherein the executing the job request in the interactive mode includes using notebooks for simplifying the job request to a read or a write operation.

14. The method of claim 12, wherein the job request is submitted in the batch mode, and wherein the batch mode includes a real-time API access for submitting the job request.

15. The method of claim 12, wherein the performing the data analytics, using the computer platform, includes obtaining an alert from an enterprise monitoring system.

16. The method of claim 11, wherein the optimizing the retrieved information includes transforming the retrieved information using at least a Unified Data Catalog, and wherein the transforming using at least the Unified Data Catalog enables storage and use of metadata associated with the retrieved information.

17. The method of claim 16, wherein the metadata associated with the retrieved information comprises real-time metrics about the retrieved information.

18. A non-transitory machine-readable medium having stored thereon machine-readable instructions executable to cause a machine to perform operations comprising:
    automatically discovering that information is available for processing at a plurality of data storages;
    receiving an application request, from an integration platform, to retrieve the information from a data storage of the plurality of data storages, wherein the data storage corresponds to a data analytics application in which the application request was received, wherein the data analytics application is one of a plurality of data analytics applications integrated into the integration platform, and wherein each of the plurality of data analytics applications is associated with one or more of the plurality of data storages;
    converting the application request to a data query that has a processing format that is accepted by the data storage;
    based on the data query, retrieving the information from the data storage via an application programming interface that corresponds to the data storage;
    determining a processing capability of the data analytics application and an incoming rate of data from the data storage;
    based on the processing capability of the data analytics application and the incoming rate of data from the data storage, switching a processing of the information from batch processing to stream processing;
    performing data analytics, using a computer platform, on the retrieved information;
    in response to the data analytics performed, optimizing the information for deployment into the integration platform, wherein the optimizing allows for a visual representation of the data analytics of the retrieved information integrated with other visual representations of data analytics corresponding to other data analytics applications of the plurality of data analytics applications integrated into the integration platform;
    integrating the retrieved information and the optimized information into the integration platform;
    visually presenting the data analytics of the retrieved information via a graphical user interface of the integration platform; and
    providing access to the retrieved information via the graphical user interface of the integration platform.

19. The non-transitory medium of claim 18, wherein the performing the data analytics includes using a job server of the computer platform to execute a job request submitted in an interactive mode or a batch mode.

20. The non-transitory medium of claim 19, wherein the job request is executed in the interactive mode, and wherein the executing the job request in the interactive mode includes using notebooks for simplifying the job request to a read or a write operation.

* * * * *